US011878601B2

(12) United States Patent
Koehler et al.

(10) Patent No.: US 11,878,601 B2
(45) Date of Patent: Jan. 23, 2024

(54) DEVICE FOR HOLDING A CHARGING CABLE FOR ELECTRIC AND HYBRID VEHICLES

(71) Applicant: FORD GLOBAL TECHNOLOGIES, LLC, Dearborn, MI (US)

(72) Inventors: Juergen Koehler, Cologne (DE); Mustafa Yuecel, Kamen (DE); Volker Krolzig, Pulheim (DE); Werner Jakobs, Bergisch Gladbach (DE); Stephan A. Grymel, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 171 days.

(21) Appl. No.: 17/500,117

(22) Filed: Oct. 13, 2021

(65) Prior Publication Data

US 2022/0111745 A1 Apr. 14, 2022

(30) Foreign Application Priority Data

Oct. 14, 2020 (DE) .......................... 102020212947.9

(51) Int. Cl.
*B60L 53/30* (2019.01)
*H02J 7/00* (2006.01)
*B60L 53/18* (2019.01)

(52) U.S. Cl.
CPC ............... *B60L 53/30* (2019.02); *B60L 53/18* (2019.02); *H02J 7/0042* (2013.01)

(58) Field of Classification Search
CPC .............................. B60L 53/30; H02J 7/0042
(Continued)

(56) References Cited

U.S. PATENT DOCUMENTS 5,445,252 A * 8/1995 McKee ................ B65H 75/425
191/12 C
2013/0020984 A1* 1/2013 Lucas ..................... B60R 11/06
383/33
(Continued)

FOREIGN PATENT DOCUMENTS

DE 1788471 U 5/1959
DE 102011006104 A1 3/2012
(Continued)

OTHER PUBLICATIONS

Search Report, DE 10 2020 212 9479 dated Jan. 13, 2021.

*Primary Examiner* — Suchin Parihar
(74) *Attorney, Agent, or Firm* — Vichit Chea; Carlson, Gaskey & Olds, P.C.

(57) ABSTRACT

A cable-holding device may be provided for electric and hybrid vehicles that are provided with a rechargeable storage device for storing electrical energy. The storage device may include a charging cable that can be connected to an external power supply device for the purpose of charging the storage device and is at least temporarily connected to the vehicle. The charging cable is stowed in the cable-holding device of the vehicle when not in use. The cable-holding device includes a closed holding space for receiving the charging cable. The holding space is delimited by a lower plate and an upper plate and is closed on all sides. A clear height of the holding space is only slightly greater than the diameter of the charging cable. A holding surface for the charging cable on the lower plate is dimensioned to be large enough that the whole charging cable can be held in the form of loops, and the holding space has a side through opening for the charging cable.

20 Claims, 4 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2017/0253137 A1* | 9/2017 | Stauber | B60L 53/18 |
| 2019/0248250 A1* | 8/2019 | Lyutskanov | B60L 53/16 |
| 2022/0379752 A1* | 12/2022 | Zenner | B60L 53/18 |

FOREIGN PATENT DOCUMENTS

| | | |
|---|---|---|
| DE | 102011116743 A1 | 5/2012 |
| DE | 102013206761 A1 | 10/2014 |
| DE | 102017203327 B4 | 10/2019 |
| EP | 2690735 A1 | 1/2014 |

* cited by examiner

DEVICE FOR HOLDING A CHARGING CABLE FOR ELECTRIC AND HYBRID VEHICLES

CROSS-REFERENCE TO RELATED APPLICATIONS

This disclosure claims priority to German Patent Application No. DE 10 2020 212 947.9, which was filed on Oct. 14, 2020 and is incorporated herein by reference in its entirety.

BACKGROUND

The disclosure relates to a cable-holding device for electric and hybrid vehicles which are provided with a rechargeable storage device for electrical energy. The storage device has a charging cable which can be connected to an external power supply device for the purpose of charging the storage device and remains permanently or at least temporarily connected to the vehicle, and the charging cable is stowed in the cable-holding device of the vehicle when not in use.

A motor vehicle in which the charging cable can be removed from the vehicle through a side opening in order to connect the plug to an external power supply device is known from DE 10 2011 116 743 A1. After charging the electrical storage device, the charging cable is pushed back into the vehicle, wherein the cable is deposited on a flat base plate in the form of just a single open loop. In such a device, a relatively large amount of space is required in order to transport the charging cable through the vehicle opening into the interior space to the depositing surface. It is furthermore a disadvantage that the charging cable needs to be dimensioned to be relatively short because the cable can be deposited on the horizontal support just in a single open loop.

A cable store for an electric charging cable is known from DE 10 2013 206 761 B4 in which the charging cable can be coiled on a rotatable drum. Such a device also requires a lot of space and its suitability for use in smaller vehicles is therefore limited. A further disadvantage of a charging cable which is completely or partly wound on a drum is the formation of a coil which results therefrom. If the cable is used for charging in this state and there is thus voltage present or current flowing, a magnetic field can consequently be generated which in turn disrupts electrical appliances in the immediate vicinity unless shielding means are installed.

The object of the disclosure is to provide a holding device for a charging cable which can be integrated comfortably into a vehicle, even into a relatively small vehicle, in a space-saving fashion, wherein it is simultaneously intended to ensure that the charging cable is not bent excessively.

SUMMARY

This object is achieved according to the disclosure by the characterizing part of claim 1. This solution provides that a closed holding space is provided for the charging cable, that the holding space is delimited by a lower plate and an upper plate and is closed on all sides, that the clear height of the holding space is only slightly greater than the diameter of the charging cable, that the holding surface for the charging cable on the lower plate is dimensioned to be large enough that the whole charging cable can be held in the form of loops, and that the holding space has a side through opening for the charging cable.

The cable-holding device according to the disclosure is characterized in particular in that it has an extremely flat design and can thus be attached at different points of the vehicle, such as in the region of the trunk, for example, as the trunk floor or the cargo area floor, below the vehicle floor, for example, as an underbody enclosure or underbody insulation, or in the vehicle roof, for example, in the vehicle roof liner.

In order to ensure that the charging cable is deposited particularly carefully, the holding surface of the holding space is expediently arranged approximately horizontally and can optionally be coated so as to reduce friction.

The holding surface can moreover have an essentially rectangular design, as a result of which a large number of cable loops can be held and relatively large cable lengths can also be accommodated.

The side through opening for the charging cable may be delimited by two rotatable guide rollers or transport rollers, the axes of which are arranged perpendicular to the direction in which the charging cable passes through.

The bearing surfaces of the guide rollers or transport rollers between which the charging cable is guided expediently have a concave design such that the charging cable is guided reliably.

In such an arrangement, the bearing surfaces of the guide rollers or transport rollers can have a roughened or toothed design such that good frictional contact between the charging cable and the bearing surfaces of the guide rollers or transport rollers is ensured. The bearing surfaces can also be provided with suitable coatings in order to improve the frictional contact.

In order to further improve the frictional contact and in particular to compensate tolerances in the diameter of the charging cable, at least one of the two guide rollers or transport rollers can be spring-loaded in the direction of the counter-roller.

It is furthermore possible to design the guide rollers or transport rollers as spring rollers, the springs of which are tensioned when the charging cable is pulled out from the holding space and are relaxed when the charging cable is introduced into the holding space, consequently assisting the retraction of the charging cable.

It is alternatively possible that at least one of the guide rollers or transport rollers can be driven by an electromotor in both directions of rotation. Other suitable drives are alternatively also possible.

The two guide rollers or transport rollers can, for example, be provided with cogwheels which are arranged on their axes of rotation and engage with each other, one of which engages directly or indirectly with the output pinion of an electric motor. A uniform, opposite rotation of the guide rollers or transport rollers is ensured by such an arrangement.

In another alternative embodiment, the guide rollers or transport rollers can be designed so that they are divided centrally into two halves perpendicular to their axes of rotation, wherein at least one of the two roller halves is pretensioned elastically against the other roller half by a spring mechanism. Such a construction has the advantage that the rollers can also optimally bear against the peripheral surface of the charging cable when the distance between the axes of rotation of the two rollers relative to each other is fixed. In this respect, differences or tolerances of the cable diameter can also be optimally compensated with this arrangement.

In a construction in which the charging cable is guided through a passage in the side of the holding space to the electrical storage device, a strain relief device for the charging cable is expediently provided in or at this passage such that no damage can occur to the connecting region between the end of the charging cable and the electrical storage device when the charging cable is pulled out from the holding space.

If the holding device for the charging cable is provided in the region of the trunk, the upper plate of the cable-holding device expediently forms the cargo area in the trunk of the vehicle. In order to be able to remove the charging cable comfortably with such a construction, a flap which can be pivoted upward or removed to withdraw the charging cable may be arranged on that side of the upper plate which faces the rear of the vehicle.

In this construction, the plug which is arranged on the charging cable and can be connected to the external power supply device can be fastened detachably on the underside of the flap. It is consequently advantageous that, when the flap is opened, the plug of the charging cable is always ready to be taken hold of comfortably.

In such an embodiment, the cable must be removed upward from the horizontal arrangement. In order to make this easier, a rotatably mounted deflection roll, by means of which the charging cable can be deflected upward from the horizontal position, can be arranged in the region of the flap opening. Particularly comfortable removal and reinsertion of the charging cable is consequently possible.

BRIEF DESCRIPTION OF DRAWINGS

The disclosure is illustrated by way of examples in the drawings and described below in detail with the aid of the drawings, in which.

DETAILED DESCRIPTION

Figure 1:
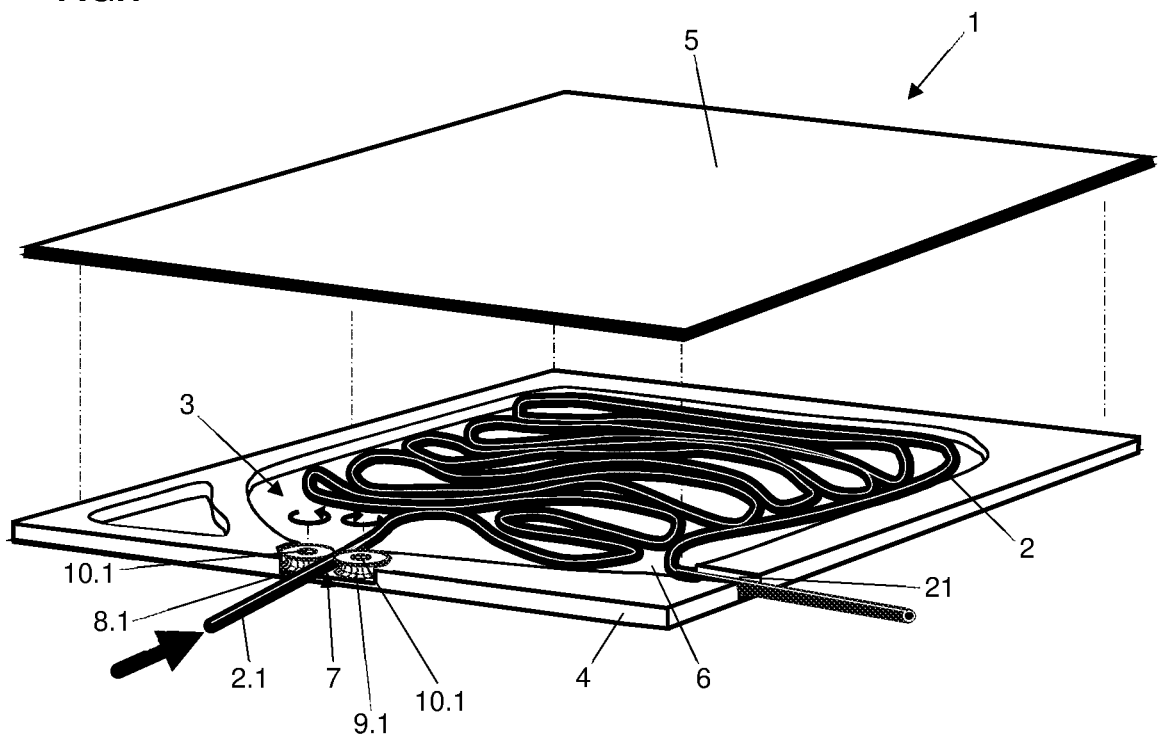
FIG. 1 shows a first exemplary embodiment of the cable-holding device according to the disclosure in a perspective view.

A cable-holding device 1 according to the disclosure is provided for electric and hybrid vehicles which are provided with a rechargeable storage device, not illustrated in the drawings, for electrical energy. The storage device here has a charging cable 2 which can be connected to an external power supply device for the purpose of charging the storage device and remains permanently connected to the vehicle. When not in use, the charging cable 2 is stowed in the cable-holding device 1, fixedly connected to the vehicle, of the respective vehicle.

According to FIG. 1 of the drawings, the cable-holding device 1 according to the disclosure has a closed holding space 3 for the charging cable 2. The cable holding space 3 is here delimited by a lower plate 4 and an upper plate 5. The clear height of this holding space 3 is only slightly greater than the diameter of the charging cable 2. The outer edge between the two plates 4 and 5 is closed on all sides. A holding surface 6, provided in the holding space 3, for the charging cable 2 on the lower plate 4 is dimensioned to be large enough that the whole charging cable 2 can be held in the form of loops. The holding space 3 has a side through opening 7 for the charging cable 2 through which the charging cable end 2.1 can be pulled for connection to an external power supply device and be pushed in again after the charging procedure.

In the exemplary embodiment illustrated in FIG. 1, the holding space 3 is formed by a depression, which forms the holding space 3, being provided in the lower plate 4. The upward projecting edge of the lower plate 4 then defines the height of the holding space 3 after the upper plate 5 has been applied and fastened. Because the clear height of the holding space 3 is only slightly greater than the diameter of the charging cable, when the charging cable is pushed in through the side through opening 7, the loops cannot slide over each other and instead are lined up one behind the other within a plane. If the charging cables were to all have exactly the same diameter, the clear height could be dimensioned precisely such that the cable diameter fits therein with a small amount of play. However, because the cable diameters vary within a certain tolerance range, this tolerance range should be taken into account when setting the clear height between the plates 4 and 5. The only important thing is that the loops of the charging cable do not slide over one another when it is introduced into the holding space 3.

The cable-holding device 1 can be installed anywhere in the respective vehicle where a corresponding mounting surface is available. A suitable place is, for example, the trunk, wherein the upper plate 5 of the cable-holding device 1 forms the cargo area in the trunk of the vehicle. In this position, the holding surface 6 is arranged approximately horizontally such that the charging cable 2 can optimally lie in loops when it is pushed into the holding space 3. The holding space 3 here has an essentially rectangular design such that there is sufficient space for the formation of loops and the required cable length can be accommodated in the cable-holding device.

In the exemplary embodiment illustrated in FIG. 1, the side through opening 7 is delimited by two rotatable guide rollers or transport rollers 8.1 and 9.1, the axes 10.1 of which are arranged perpendicular to the direction in which the charging cable 2 passes through, i.e. vertically when the plates are positioned horizontally.

Figure 2:
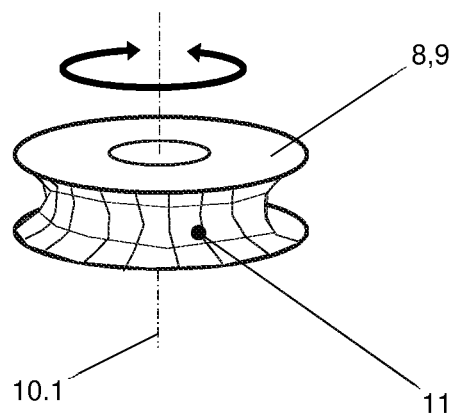
FIG. 2 shows one of the guide rollers or transport rollers in an enlarged view.

Such a guide roller or transport roller, the bearing surface 11 of which between which the charging cable 2 is guided is formed in concave fashion in the manner of a pulley, is illustrated in FIG. 2. The bearing surface 11 is here roughened or toothed in order to obtain a good frictional contact between the two rollers 8.1 and 9.1 and the charging cable 2.

In the exemplary embodiment according to FIG. 1, at least one of the two guide rollers or transport rollers 8.1 or 9.1 is spring-loaded in the direction of the respective counter-roller such that it is always ensured that the rollers 8.1 and 9.1 bear reliably and firmly on the charging cable 2. Slippage between the charging cable 2 and the rollers 8.1 and 9.1 can be minimized as a result.

In the exemplary embodiment according to FIG. 1, the rollers 8.1 and 9.1 are designed as spring rollers, the springs of which are tensioned when the charging cable 2 is pulled out from the holding space 3 and are relaxed when the charging cable 2 is pushed in, consequently assisting the retraction of the charging cable into the holding space 3. The principle of spring rollers is known per se and does not need to be described in detail.

Figure 4:
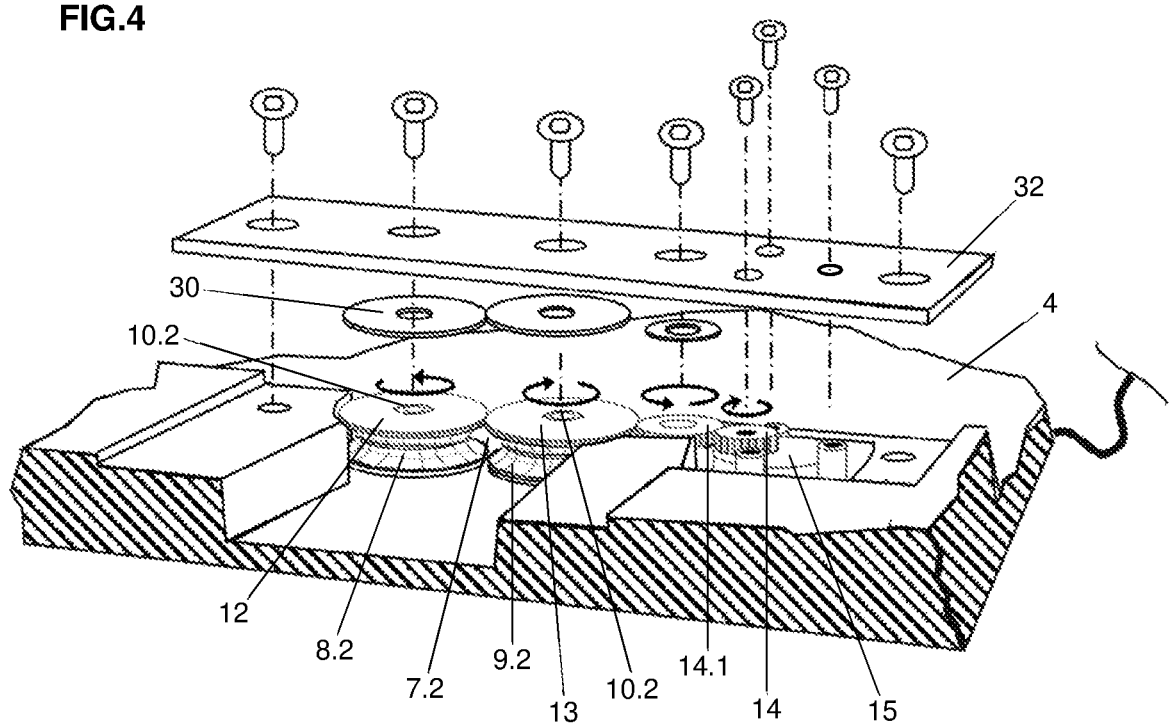
FIG. 4 shows a third exemplary embodiment of the cable-holding device according to the disclosure.
Figure 5:
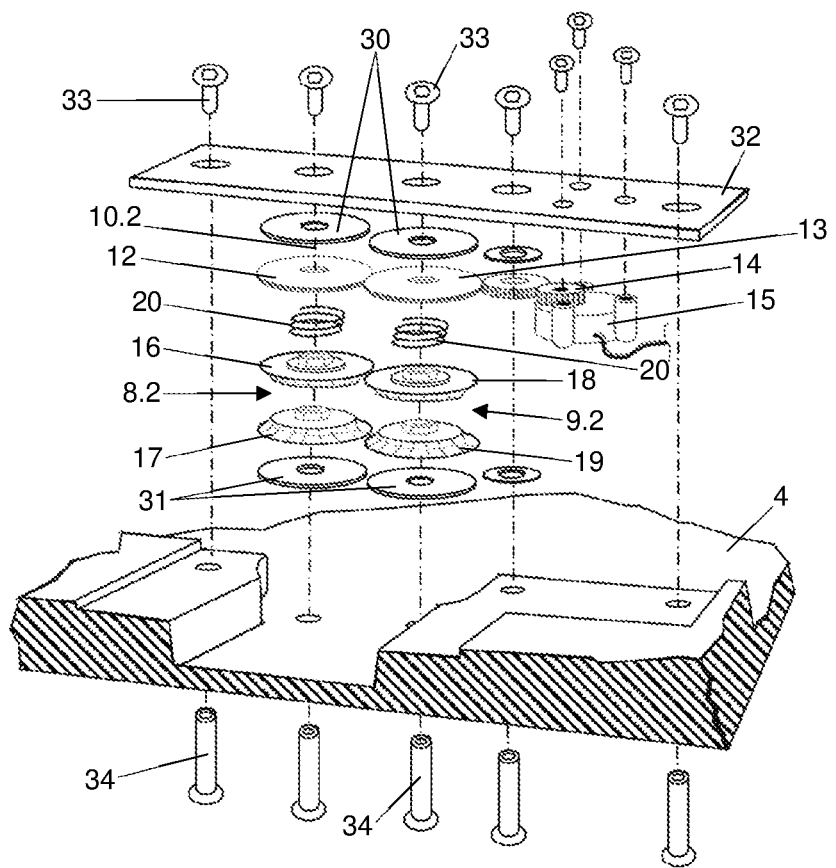
FIG. 5 shows the same view as in FIG. 4 in an exploded view.
Figure 6:
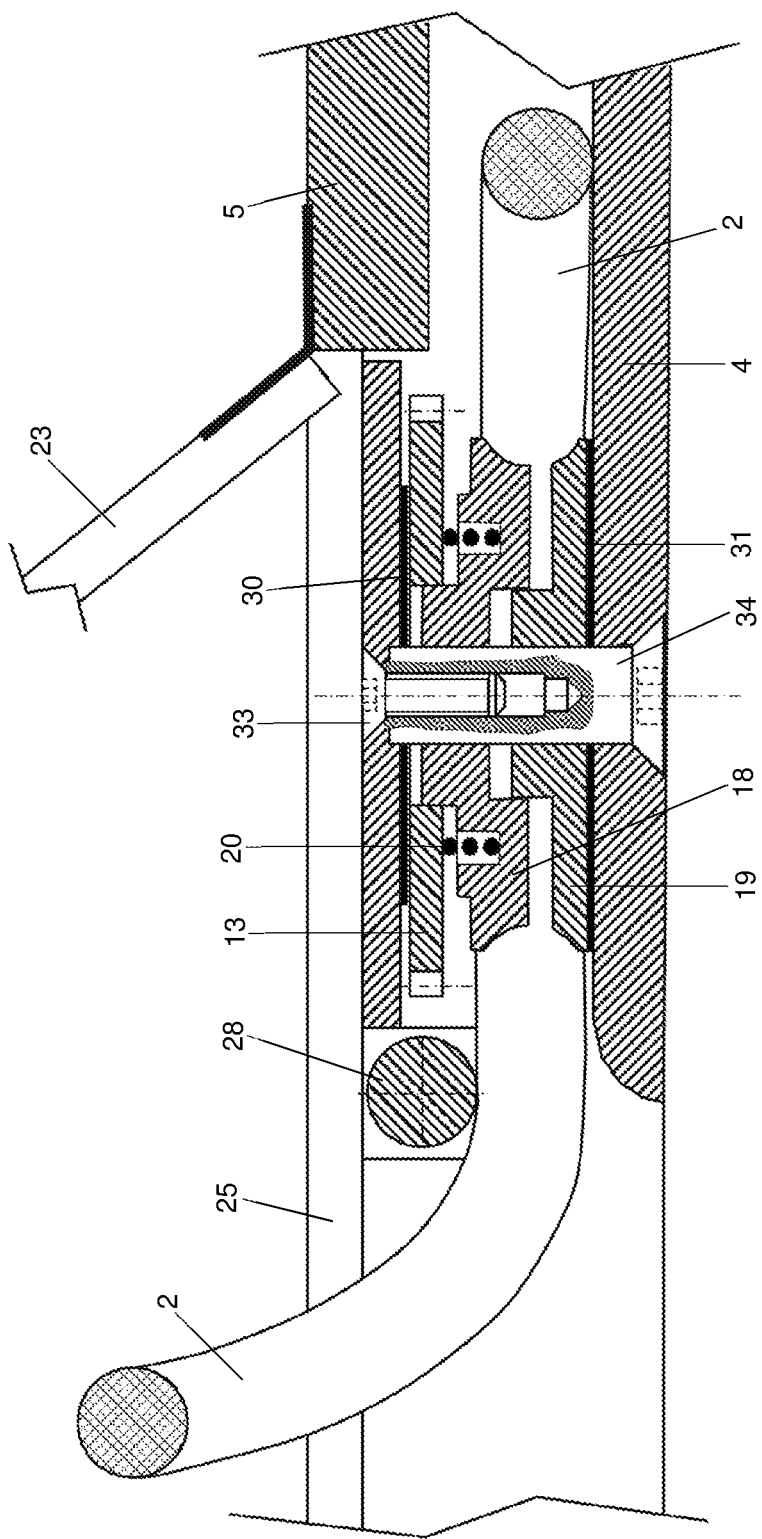
FIG. 6 shows a partial section through the cable-holding device according to FIG. 4 and FIG. 5 in an enlarged view.

In the exemplary embodiment according to FIG. 4 to FIG. 6, at least one of the rollers 8.2 or 9.2 is driven by an electromotor in both directions of rotation. According to the view in FIG. 4 and FIG. 5, both rollers 8.2 and 9.2 are driven. Both rollers 8.2 and 9.2 are thus provided with cogwheels 12 and 13 which engage with each other and are arranged fixedly on their axes of rotation, the cogwheel 13 of which arranged on the right in the drawings is driven by the output pinion 14 of an electric motor 15. The output pinion 14 of the electric motor 15 thus meshes with an intermediate wheel 14.1 which in turn engages with the cogwheel 13. Alternatively, the output pinion 14 of the electric motor 15 could also engage directly with the cogwheel 13 of the roller 9.2 such that the intermediate wheel 14.1 could be dispensed with. Any other type of suitable drive can also be used instead of the electric motor 15.

In the exemplary embodiment illustrated in FIG. 4 to FIG. 6, the guide rollers or transport rollers 8.2 and 9.2 cannot be pretensioned toward each other, as is possible in the exemplary embodiment according to FIG. 1. However, in order to nevertheless enable good frictional contact with the charging cable 2, the rollers 8.2 and 9.2 are designed so that they are divided approximately centrally into two halves 16 and 18 and 17 and 19, perpendicular to their axes of rotation 10.2. The respective upper roller halves 16 and 18 are here elastically pretensioned toward the respective other roller half 17 and 19 by means of a spring mechanism 20. Therefore, when a relatively thick charging cable 2 is passed between the rollers 8.2 and 9.2, the upper roller halves 16 and 18 can rise a little relative to the lower roller halves 17 and 19 such that it is ensured there is good frictional contact at all times. The two roller halves 16 and 17 and 18 and 19 which respectively form a guide roller or transport roller are thus connected positively to each other in any relative position in the direction of rotation. The same applies for the two upper roller halves 16 and 18 with respect to the cogwheels 12 and 13 which are connected to each other and with the latter in the direction of rotation.

The rollers 8.2 and 9.2, together with the cogwheels 12 and 13, are installed between the lower plate 4 and an upper mounting plate or a support plate 32. In order to reduce the friction here, sliding plates 30 and 31 are provided on the upper side of the plate 4 and the underside of the mounting plate or the support plate 32.

The mounting plate or the support plate 32 is fixed to the lower plate 4 with the aid of screws 33 and pins 34 having an internal thread. For this purpose, the pins 34 provided with the internal thread are pushed from below through bores 35 provided in the plate 4, whilst the screws 33 are screwed from above through bores 36 provided in the mounting plate or the support plate 32 into the internal thread of the pins 34.

Figure 3:
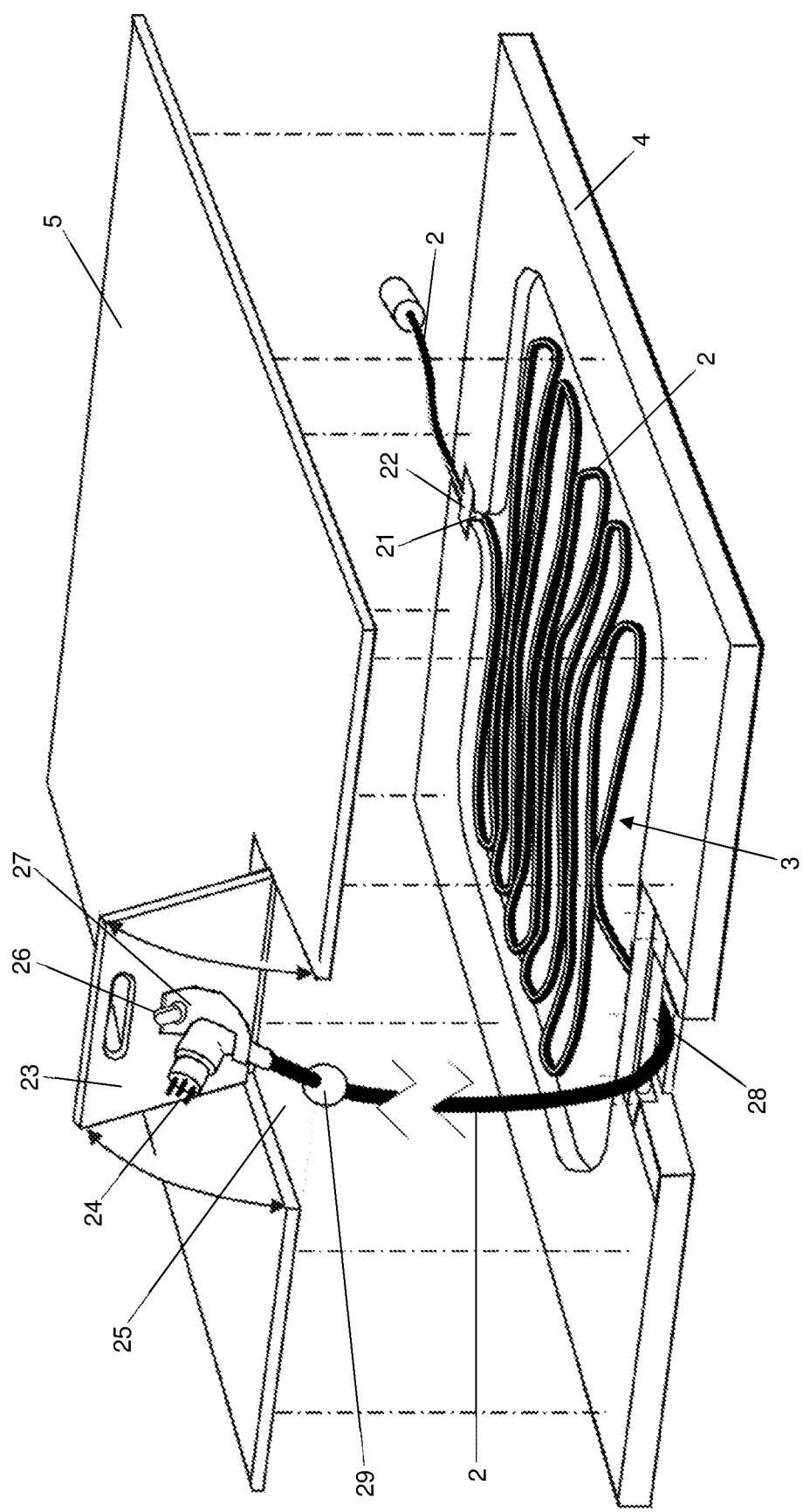
FIG. 3 shows a second exemplary embodiment of the cable-holding device according to the disclosure.

A further exemplary embodiment of the cable-holding device 1 is illustrated in FIG. 3. In this exemplary embodiment, the upper plate 5 serves as the cargo area of a trunk such that the holding space 3 for the charging cable 2 in this case lies immediately below the cargo area of the trunk.

In order to reach the plug 24 of the charging cable 2 comfortably, a flap 23 for leading out the charging cable 2 is arranged on that side of the upper plate 5 which faces the rear of the vehicle and can be pivoted upward or simply removed.

The plug 24 which is to be connected to the external power supply device and is arranged on the extractable connection end 2.1 of the charging cable 2 is here fastened detachably on the underside of the flap 23. When the flap 23 is pivoted upward, the plug 24 is therefore raised into a position in which it can be accessed comfortably for removal. The detachable fastening is effected by a tab 27 which is fixedly connected to the charging cable 2 and engages over a hook 26 provided on the underside of the flap 23. Alternatively, any other detachable fastenings can also be used.

When the flap 23 is opened, the initially horizontally extending charging cable 2 is raised into a perpendicular position. In order to facilitate this procedure, a rotatably mounted deflection roller 28 is arranged below the flap opening 25. This feature is illustrated in particular in FIG. 6.

In order to ensure in all three exemplary embodiments that the charging cable 2 is not pulled too far into the holding space 3, as illustrated in FIG. 3, a stopper 29 is provided shortly before the free connection end 2.1 of the charging cable 2.

A cable-holding device is provided by the disclosure which can be installed in almost all types of vehicle in a space-saving fashion, enables the electrical storage device to be charged quickly and cleanly, and ensures that the charging cable is stowed neatly.

LIST OF REFERENCE NUMERALS

The following reference numerals are utilized in this disclosure:
1 cable-holding device
2 charging cable
2.1 connection end of the charging cable
3 holding space
4 lower plate
5 upper plate
6 holding surface
7.1 side through opening
7.2 side through opening
8.1 guide roller or transport roller
8.2 guide roller or transport roller
9.1 guide roller or transport roller
9.2 guide roller or transport roller
10.1 axes of rotation
10.2 axes of rotation
11 bearing surface of the guide rollers
12 cogwheel
13 cogwheel
14 output pinion
14.1 intermediate wheel
15 electric motor
16 roller half
17 roller half
18 roller half
19 roller half
20 spring mechanism
21 passage
22 strain relief device
23 flap
23.1 hinge
24 plug
25 flap opening
26 hook
27 tab
28 deflection roller
29 stopper
30 sliding plates
31 sliding plates
32 mounting plate or support plate
33 screws
34 pins with internal thread 35 bores
36 bores

What is claimed is:

1. A cable-holding device for electric and hybrid vehicles that include a rechargeable storage device for storing electrical energy, wherein the rechargeable storage device includes a charging cable that can be connected to an external power supply device for the purpose of charging the rechargeable storage device and is at least temporarily connected to the vehicle, and wherein the charging cable is stowed in the cable-holding device of the vehicle when not in use,
   wherein the cable-holding device provides a closed holding space for the charging cable,
   wherein the closed holding space is delimited by a lower plate and an upper plate and is closed on all sides,
   wherein a clear height of the closed holding space is slightly greater than a diameter of the charging cable,
   wherein a holding surface for the charging cable on the lower plate is dimensioned to be large enough that an entirety of the charging cable can be held in the form of loops, and
   wherein the closed holding space includes a side through opening for the charging cable.

2. The cable-holding device as recited in claim 1, wherein the closed holding surface is arranged approximately horizontally within the vehicle.

3. The cable-holding device as recited in claim 1, wherein the holding surface has an essentially rectangular design.

4. The cable-holding device as recited in claim 1, wherein the side through opening is delimited by two rotatable guide rollers or transport rollers, the axes of which are arranged perpendicular to a direction in which the charging cable passes through.

5. The cable-holding device as recited in claim 4, wherein bearing surfaces of the guide rollers or transport rollers between which the charging cable is guided have a concave design, and further wherein the bearing surfaces of the guide rollers or transport rollers have a roughened or toothed design.

6. The cable-holding device as recited in claim 4, wherein at least one of the two guide rollers or transport rollers is spring-loaded in the direction of a counter-roller.

7. The cable-holding device as recited in claim 4, wherein the guide rollers or transport rollers are configured as spring rollers, and springs of the spring rollers are tensioned when the charging cable is pulled out from the closed holding space and are relaxed when the charging cable is introduced into the closed holding space during retraction of the charging cable.

8. The cable-holding device as recited in claim 4, wherein at least one of the guide rollers or transport rollers is driven by a motor in both directions of rotation, and further wherein the two guide rollers or transport rollers are provided with cogwheels that are arranged on their axes of rotation and engage with each other, one of which engages directly or indirectly with an output pinion of an electric motor.

9. The cable-holding device as recited in claim 5, wherein the guide rollers or transport rollers are configured such that they are divided centrally into two halves perpendicular to their axes of rotation, and in that at least one of the two roller halves is pretensioned elastically against the other roller half by a spring mechanism.

10. The cable-holding device as recited in claim 1, wherein the charging cable is guided through a passage in the side of the holding space to the electrical storage device, and a strain relief device for the charging cable is provided in or at the passage.

11. The cable-holding device as recited in claim 1, wherein the upper plate of the cable-holding device forms part of a cargo area of a trunk of a vehicle, and a flap that is pivotable or removable to withdraw the charging cable is arranged on a side of the upper plate that faces a rear of the vehicle.

12. The cable-holding device as recited in claim 11, wherein a plug arranged on an end of the charging cable is connected to the external power supply device and is fastened detachably on an underside of the flap.

13. The cable-holding device as recited in claim 11, wherein a rotatably mounted deflection roll by which the charging cable can be deflected upward from the horizontal position is arranged in a region of the flap.

14. A vehicle comprising the cable-holding device of claim 1.

15. The cable-holding device as recited in claim 1, wherein the loops are non-overlapping and line up one behind the other within a common plane.

16. The cable-holding device as recited in claim 1, comprising a stopper provided near a connection end of the charging cable and configured to prevent the connection end from being pulled too far into the closed holding space.

17. A cable-holding device for storing a vehicle charging cable, comprising:
   a lower plate;
   an upper plate fastened to the lower plate; and
   a closed holding space delimited by the upper plate and the lower plate and closed on all sides, wherein the closed holding space is configured for horizontally receiving the vehicle charging cable,
   wherein the closed holding space is established by a depression formed in the lower plate and an upward projecting edge of the lower plate that defines a height of the closed holding space after securing the upper plate to the lower plate.

18. The cable-holding device as recited in claim 17, wherein the height of the closed holding space is greater than a diameter of the vehicle charging cable.

19. The cable-holding device as recited in claim 17, wherein the closed holding space includes a rectangular shape.

20. The cable-holding device as recited in claim 17, wherein the upper plate establishes a portion of a cargo area of a vehicle that is equipped with the cable-holding device.

* * * * *